(12) United States Patent
Seitz et al.

(10) Patent No.: US 11,588,171 B2
(45) Date of Patent: *Feb. 21, 2023

(54) THIN FILM ELECTROCHEMICAL CELL ACTIVATED WITH A SOLID ELECTROLYTE AND HOUSED IN A CASING FORMED OF OPPOSED CERAMIC SUBSTRATES SEALED TOGETHER WITH AN INTERMEDIATE RING-SHAPED METALLIZATION

(71) Applicant: Greatbatch Ltd., Clarence, NY (US)

(72) Inventors: Keith W. Seitz, Clarence Center, NY (US); Xiaohong Tang, Williamsville, NY (US); Holly Noelle Moschiano, Williamsville, NY (US); Biswa P. Das, Thousand Oaks, CA (US); Brian P. Hohl, Clarence, NY (US)

(73) Assignee: Greatbatch Ltd., Clarence, NY (US)

( * ) Notice: Subject to any disclaimer, the term of this patent is extended or adjusted under 35 U.S.C. 154(b) by 289 days.

This patent is subject to a terminal disclaimer.

(21) Appl. No.: 16/812,492

(22) Filed: Mar. 9, 2020

(65) Prior Publication Data

US 2020/0303763 A1 Sep. 24, 2020

Related U.S. Application Data

(60) Provisional application No. 62/820,516, filed on Mar. 19, 2019.

(51) Int. Cl.
*H01M 50/10* (2021.01)
*H01M 50/116* (2021.01)
(Continued)

(52) U.S. Cl.
CPC ........ *H01M 10/052* (2013.01); *H01M 4/131* (2013.01); *H01M 4/662* (2013.01);
(Continued)

(58) Field of Classification Search
None
See application file for complete search history.

(56) References Cited

U.S. PATENT DOCUMENTS 7,811,702 B2  10/2010 Laurent et al.
8,815,450 B1*  8/2014 Bates ............... H01M 10/0525
429/231.95

(Continued)

*Primary Examiner* — Haixia Zhang
(74) *Attorney, Agent, or Firm* — Michael F. Scalise

(57) ABSTRACT

A miniature electrochemical cell having a total volume that is less than 0.5 cc is described. The cell casing is formed by joining two ceramic casing halves together. One or both casing halves are machined from ceramic to provide a recess that is sized and shaped to contain the electrode assembly. The opposite polarity terminals are electrically conductive feedthroughs or pathways, such as of gold, and are formed by brazing gold into tapered via holes machined into one or both ceramic casing halves. The two ceramic casing halves are separated from each other by a metal interlayer, such as of gold, bonded to a thin film metallization layer, such as of titanium, that contacts an edge periphery of each ceramic casing half. A solid electrolyte of LiPON ($Li_xPO_yN_z$) is used to activate the electrode assembly.

26 Claims, 7 Drawing Sheets

(51) Int. Cl.
*H01M 10/052* (2010.01)
*H01M 10/0562* (2010.01)
*H01M 4/131* (2010.01)
*H01M 4/66* (2006.01)
*H01M 50/186* (2021.01)
*H01M 50/191* (2021.01)
*H01M 50/124* (2021.01)

(52) U.S. Cl.
CPC ....... *H01M 10/0562* (2013.01); *H01M 50/10* (2021.01); *H01M 50/116* (2021.01); *H01M 50/1243* (2021.01); *H01M 50/186* (2021.01); *H01M 50/191* (2021.01)

(56) References Cited

U.S. PATENT DOCUMENTS

| | | | |
|---|---|---|---|
| 10,770,698 B1* | 9/2020 | Seitz | H01M 50/186 |
| 2018/0006293 A1* | 1/2018 | Demaray | C01G 23/00 |
| 2019/0097183 A1* | 3/2019 | Chen | H01M 50/11 |
| 2020/0274113 A1* | 8/2020 | Dang | H01M 10/052 |

* cited by examiner

THIN FILM ELECTROCHEMICAL CELL ACTIVATED WITH A SOLID ELECTROLYTE AND HOUSED IN A CASING FORMED OF OPPOSED CERAMIC SUBSTRATES SEALED TOGETHER WITH AN INTERMEDIATE RING-SHAPED METALLIZATION

CROSS-REFERENCE TO RELATED APPLICATION

This application claims priority to U.S. Provisional Application Ser. No. 62/820,516, filed on Mar. 19, 2019.

BACKGROUND OF THE INVENTION

1. Field of the Invention

This invention relates to the conversion of chemical energy to electrical energy. More particularly, the present invention relates to an electrochemical cell having a total size or volume that is less than 0.5 cc. Such so-called miniaturized electrochemical cells enable numerous new and improved medical device therapies. Miniature electrochemical cells are defined as those having a size or total volume that is less than 0.5 cc.

2. Prior Art

Electrochemical cells must have two opposite polarity terminals that are electrically isolated from each other. In use, the terminals are connected to a load, such as the circuitry in an implantable medical device to power the medical device. In that respect, an electrochemical cell which is sufficiently hermetic to prevent ingress of moisture and egress of electrolyte so that it can operate for 10 years or more requires robust sealing methodologies while still providing adequate electrical isolation between the opposite polarity terminals. However, conventional sealing techniques are often not practical when cell size drops below 0.5 cc. That is because the seals themselves take up a major portion of the overall cell volume.

Thin film batteries are a convenient approach for the assembly of small cells. Electroactive layers are deposited, typically by physical vapor deposition, onto a substrate with an intermediary layer of solid electrolyte that also functions as a separator to electrically isolate the two terminals. The substrate must be able to withstand high temperatures during layer deposition and during any required annealing of the deposited layers. Typically, ceramics are used as substrates with a non-porous lid attached using a polymeric adhesive layer that also serves as the feedthrough for the electrically charged terminals. The problem is that the polymeric adhesive layer cannot consistently and adequately prevent egress or ingress of atmospheric contaminants that can disrupt charging and discharging of the cell. For example, ingress of water is particularly problematic for lithium cells. Thus, polymeric seals may not provide the consistent longevity required for some applications.

Moreover, as electrochemical cells become smaller and smaller, it becomes more difficult to find space for a port for filling electrolyte into their casings. As the fill port becomes smaller, it becomes increasingly more difficult to find a practical means of plugging and hermetically sealing the fill port. For electrochemical cells that have a total volume or size that is less than 0.5 cc, it becomes advantageous to use a solid electrolyte so that no filling is required.

Further, since secondary electrochemical cells activated with a solid electrolyte typically undergo expansion and contraction during charging and discharging, they require hermetic encapsulation approaches that suitably accommodate this cycling induced dimensional change. Those types of hermetic enclosures for miniature electrochemical cells do not currently exist.

For that reason, the present invention provides casing and terminal pathway constructions that are suitable for use with hermetically sealed solid-state secondary or re-chargeable electrochemical cells and that have sufficient dimensional flexibility to accommodate expected dimensional changes during cycling. While useful with cells of virtually any size, the present casing and terminal pathway constructions are particularly well suited for cells having a total volume or size that is less than 0.5 cc.

SUMMARY OF THE INVENTION

The present invention describes various electrochemical cell constructions which are readily adapted to miniature cell designs. While the present cell designs are adapted for miniature electrochemical cells, they are also applicable to cells that are not classified as "miniature". A miniature electrochemical cell is defined as one having a total volume that is less than 0.5 cc.

Moreover, the present electrochemical cells are not limited to any one chemistry and can be of an alkaline cell, a primary lithium cell, a rechargeable lithium cell, a Ni/cadmium cell, a Ni/metal hydride cell, a supercapacitor, a thin film solid-state cell, and the like. Preferably, the cell is a lithium-ion electrochemical cell comprising a carbon-based or $Li_4Ti_5O_{12}$-based anode and a lithium metal oxide-based cathode, such as of $LiCoO_2$ or lithium nickel manganese cobalt oxide ($LiNi_aMn_bCO_{1-a-b}O_2$). The present invention is also useful with a solid-state thin film electrochemical cell having a lithium anode, a metal-oxide based cathode and a solid electrolyte, such as an electrolyte of LiPON ($Li_xPO_yN_z$, where x=2.5 to 3.5, y=3.0 to 4.0 and z=0.15 to 0.50).

Thus, an electrochemical cell according to the present invention includes an electrode assembly comprising an anode of an anode active material conductively contacted to an anode current collector and a cathode of a cathode active material conductively contacted to a cathode current collector. The anode and cathode are segregated from direct physical contact with each other by a solid activating electrolyte.

The electrode assembly is housed in a ceramic casing formed by joining two ceramic plates or substrates serving as casing halves together. Suitable ceramics are selected from the group of yttria stabilized zirconia (yttria 3%~8 mol %), ceria stabilized zirconia, calcia stabilized zirconia, magnesia stabilized zirconia, alumina toughened zirconia (ATZ), zirconia toughened alumina (ZTA), polycrystalline alumina, and sapphire. One or both casing halves are machined from the ceramic plate or substrate to provide a recess that is sized and shaped to contain the electrode assembly when the first casing half is connected to the other casing half. If only one of the two ceramic casing halves is machined with a recess, the other casing half is a planar ceramic substrate.

Preferably the ceramic substrates comprising the casing halves have a surface roughness that is greater than zero, but less than 50 nm, and more preferably less than 10 nm. The ceramic substrates are lapped and polished with a slurry or ceramic-coated grinding paper followed by diamond polishing to produce the desired surface roughness. Providing the ceramic substrates having a surface roughness that is less than 50 nm and, more preferably, less than 10 nm helps prevent coating defects including cracks, protrusions, discontinuities and coating adhesion problems during subsequent cell processing steps.

In that respect, the casing for a miniature electrochemical cell according to the present invention comprises a first ceramic substrate having a first peripheral edge extending to and meeting with opposed first substrate inner and outer major surfaces or faces. A first ring-shaped thin-film metallization contacts the first substrate inner major face adjacent to the first peripheral edge. A second ceramic substrate has a second substrate peripheral edge extending to and meeting with opposed second substrate inner and outer major surfaces or faces. A second ring-shaped thin-film metallization contacts the second substrate inner major face adjacent to the second peripheral edge. A metal interlayer, preferably of gold, is bonded to at least one of the first and second ring-shaped thin-film metallizations to thereby hermetically seal the first and second ceramic substrates together to form the casing. At least one of the first and second ceramic substrates, preferably the planar ceramic substrate, is of a substantially transparent sapphire. That way, a laser beam can penetrate through the transparent sapphire to melt the gold interlayer to hermetically seal the first and second ceramic substrates together.

Alternatively, the gold interlayer is eliminated, and the opposed ring-shaped metallizations of titanium are used to bond the ceramic casing halves together.

Thin-film metallic layers serving as the opposite polarity current collectors are applied to the inner surface of at least one of the ceramic casing halves. The metallic current collector layers are preferably of titanium, copper, or platinum and cover as much of the inner major surface of the ceramic casing half as possible without contacting the metallization layer residing between the casing halves. This spaced relationship prevents corrosion of the gold interlayer by the metallic current collectors. Then, anode and cathode active materials are sequentially applied and adhered directly to the metallic current collectors using various types of physical vapor deposition.

A solid electrolyte of LiPON ($Li_xPO_yN_z$) is deposited between the anode and cathode layers to activate the electrode assembly.

The opposite polarity terminals are metal feedthroughs or electrically conductive pathways, such as of gold, that are formed by brazing gold into openings machined into one or both ceramic casing halves. The ceramic perimeter surfaces defining the terminal openings are pre-coated with a thin-film metallization of titanium, niobium or other metallic layer to facilitate adhesion of gold to the ceramic.

In greater detail, a first opening extends through the first ceramic substrate in alignment with the cathode current collector. A first gold body hermetically sealed to the first ceramic substrate in the first opening conductively contacts the cathode current collector to thereby serve as a positive terminal feedthrough or pathway for the cell. A second opening extends through the first ceramic substrate in alignment with the anode current collector. A second gold body hermetically sealed to the first ceramic substrate in the second opening conductively contacts the anode current collector to thereby serve as a negative terminal feedthrough or pathway for the electrochemical cell.

The cell casing is designed so that there is a gap ranging from about 1 μm to about 100 μm between the electrode assembly and the inner major surface of at least one of the first and second ceramic substrates forming the casing. This gap allows for expansion of the electrode assembly during charging and discharging without compromising hermeticity of the ceramic casing.

These and other aspects of the present electrochemical cell will become increasingly more apparent to those skilled in the art by reference to the following detailed description and to the appended drawings.

DETAILED DESCRIPTION OF THE PREFERRED EMBODIMENTS

As used herein, the term "transparent" is defined as a material having the property of transmitting rays of light through its substance so that bodies situated beyond or behind can be distinctly seen.

The term "sapphire" is defined as a variety of the mineral corundum, consisting of aluminum oxide ($\alpha$-$Al_2O_3$) as a doped or undoped material. A doped sapphire contains trace amounts of elements such as iron, titanium, chromium, copper, or magnesium. Sapphire that is useful with the present invention is synthetic and colorless. As a colorless material, the sapphire does not absorb any wavelength of visible light. Sapphire is a remarkably hard material—9 on the Mohs scale (the third hardest mineral, after diamond at 10 and moissanite at 9.5), which makes it uniquely suited for use as a casing material according to the present inventions.

Figure 1:
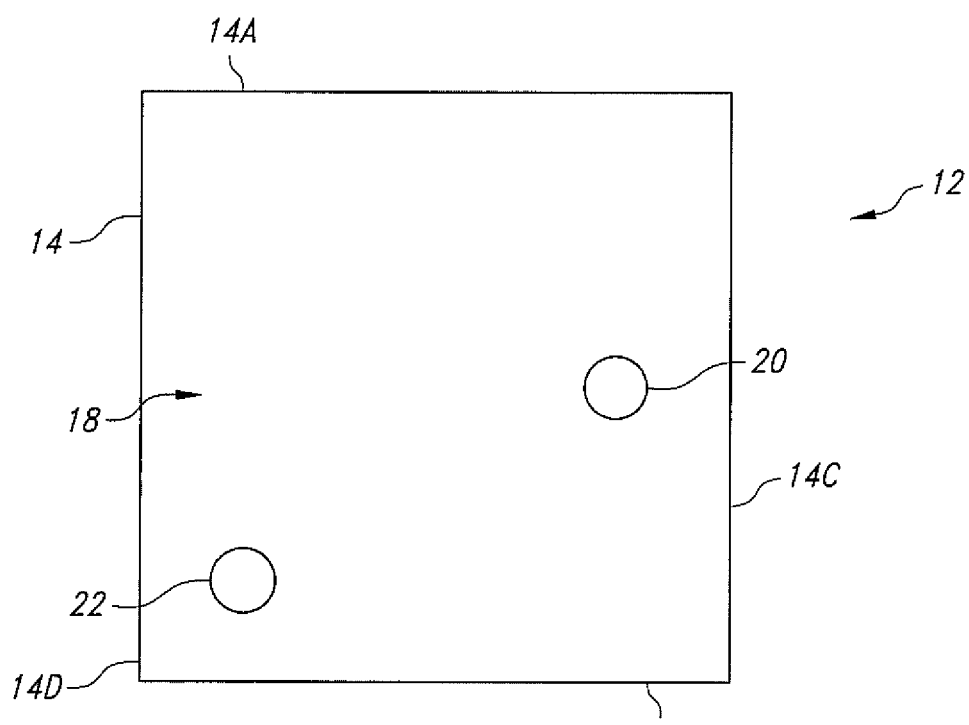
FIG. 1 is a plan view of a ceramic lid 12 for a casing of the electrochemical cells 10 and 10A illustrated in FIGS. 2 and 2A, and the electrochemical cells 10A illustrated in FIGS. 7 and 7A, respectively.
Figure 2:
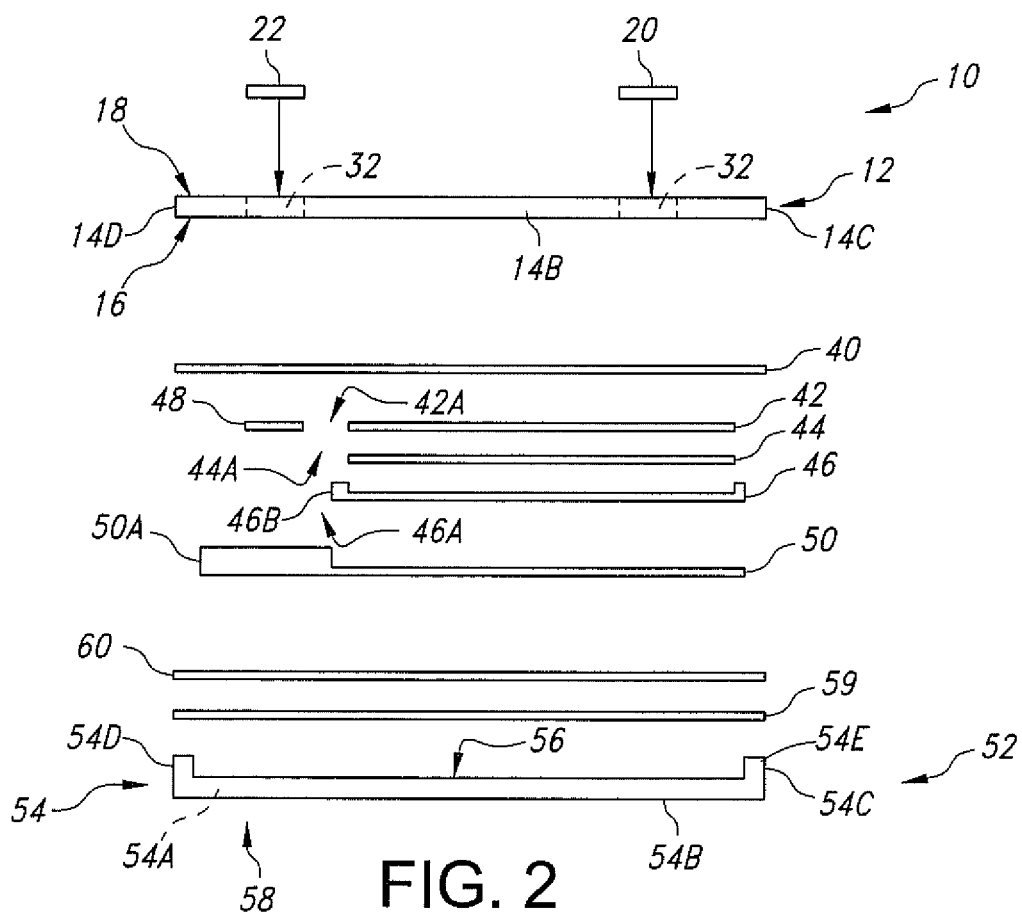
FIG. 2 is an exploded side-elevational view of an electrochemical cell 10 according to one embodiment of the present invention.

Turning now to the drawings, FIGS. 1 and 2 illustrate one embodiment of an electrochemical cell 10 according to the present invention. The electrochemical cell 10 comprises a first plate-shaped ceramic substrate 12 that is preferably selected from the group of yttria stabilized zirconia (yttria 3%~8 mol %), ceria stabilized zirconia, calcia stabilized zirconia, magnesia stabilized zirconia, alumina toughened zirconia (ATZ), zirconia toughened alumina (ZTA), polycrystalline alumina, and sapphire, and serves as one half of a casing for the cell. The ceramic substrate 12 is a planar structure forming the lid-side of the casing and comprises a lid peripheral edge 14 meeting an inner major surface or face 16 opposite an outer major surface or face 18.

In the illustrated embodiment, the peripheral edge 14 of the ceramic lid 12 comprises opposed lid first and second edges 14A and 14B extending to and meeting with lid third and fourth edges 14C and 14D. The edges are of substantially equal lengths to thereby provide the lid with a square shape in plan-view. In alternate embodiments, the lid substrate 12 has a non-square shape. In any event, the surface areas of the inner and outer major faces 16, 18 of the lid 12 are equal and range from about 1 mm$^2$ to about 10 cm$^2$.

FIG. 1 shows that the ceramic lid 12 is provided with spaced-apart first and second terminals 20 and 22. In the exemplary embodiment of the electrochemical cell illustrated in the drawing, the first and second terminals are cathode and anode terminal, respectively. However, in other embodiments of the present invention, the first and second terminals are anode and cathode terminals, respectively.

Figure 3:
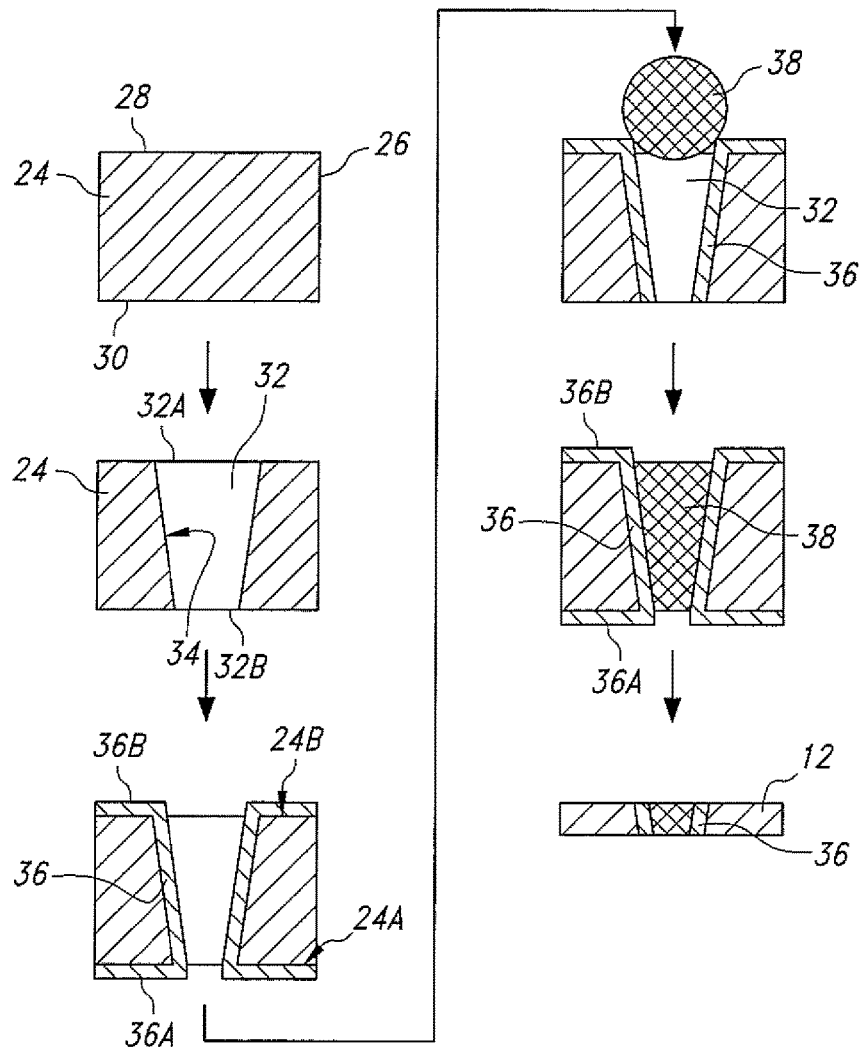
FIG. 3 illustrates the process for forming the cathode and anode terminals 20, 22 in the lid 12 shown in FIGS. 1, 2 and 2A.
Figure 4A:
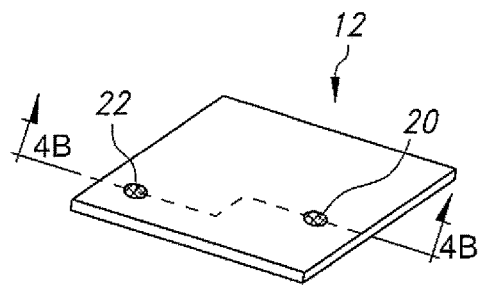
FIG. 4A is a perspective view of the lid 12 formed by the process illustrated in FIG. 3 with the cathode and anode terminals 20, 22.
Figure 4B:
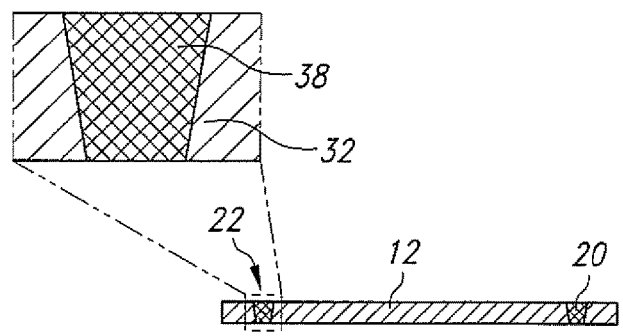
FIG. 4B is a cross-sectional view taken along line 4B-4B of FIG. 4.

FIG. 3 illustrates the process for forming the anode and cathode terminals 20, 22 in lid 12. The process begins with a plate-shaped ceramic substrate 24, preferably having a thickness of about 100 μm, or more. This substrate 24 will subsequently be lapped and polished to reduce its thickness significantly to form lid 12. The substrate 24 has a peripheral edge 26 meeting an outer major face or face 28 opposite an inner major surface or face 30.

Figure 5:
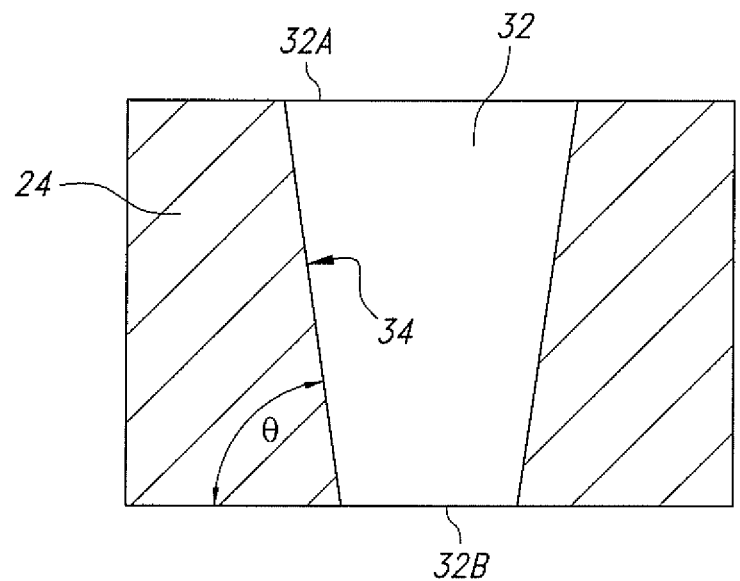
FIG. 5 is an enlarged view showing the taper of a via hole 32 extending through the substrate 24 used in the process of FIG. 3.

Two via holes are formed through the substrate 24 from the outer major face 28 to the inner major surface face 30 and each preferably has a tapered shape. These via holes will support the previously described first and second terminals 20, 22. However, for the sake of illustration, the process for forming the terminals will be described with respect to the single tapered via hole 32 shown in FIG. 3. The taper of via hole 32 extends from a greater diameter outer via portion 32A at the outer major face 28 to a lesser diameter inner via portion 32B at the inner major face 30. FIG. 5 illustrates that the taper of via hole 32 is measured from the smaller or lesser diameter inner via portion 32B side of the substrate with the angle of taper ranging from about 85° to 30°.

As will be described in detail hereinafter, the diameter of the inner via portion 32B should be less than the diameter of the final terminals 20, 22 shown in FIGS. 1, 2, 4A and 4B, i.e., less than 50 μm. However, if the diameter of the inner via portion 32B is too small or if the via hole does not extend completely through the thickness of the ceramic substrate 24, flow of gold down into the via hole 32 will be impeded or prevented. Accordingly, the outer diameter of the outer via portion 32A must be greater than the inner diameter of the inner via portion 32B and is restricted to an upper limit based on the current collector design. Importantly, the inner diameter of the inner via portion 32B is as small as possible. Further, the first and second via holes must not overlap each other or they will short, so the larger the inner diameter of the inner via portion, the smaller the cathode which reduces energy density. For a miniature electrochemical cell according to the present invention, the inner diameter of the inner via portion 32B of via hole 32 extending through substrate 24 ranges from about 20 μm to about 100 μm and the outer diameter of the outer via portion 32A ranges from about 30 μm to about 500 μm. Larger vias on the outside make it easier to make connections to the cell.

The inner surface 34 of the tapered via hole 32 is provided with an interfacial metallization 36. This metallization 36 is typically a thin-film of titanium, niobium or a mixed Ti/Nb layer that facilitates wetting of gold onto the inner surface of ceramic surrounding the via hole 32. The titanium, niobium or Ti/Nb layer should be sufficiently thick to improve wetting of gold but not so thick as to completely react with the gold. Low wetting of gold can result in partial filling of the via hole 32 while a complete reaction of the metallization with gold could result in leak paths at the gold-ceramic interface.

On the other hand, there is an upper limit to the thickness of the titanium, niobium or Ti/Nb metallization as there needs to be a sufficient amount of open area in the via hole 32 to facilitate gold flowing to the lesser diameter of the inner via portion 32B. Preferably, the metallization layer 36 has a thickness that ranges from about 0.1 μm to about 10 μm. Moreover, it is preferred that an inner portion 36A of the metallization contacts the inner major surface 24A of the ceramic substrate 24 and an outer portion 36B of the metallization contacts the outer major surface 24B. If desired for manufacturing expediency, only the outer portion 36B of the metallization contacting the outer major surface 24B adjacent to the outer via portion 32A needs to be provided.

After the exemplary via hole 32 is suitably metallized, a gold pre-form 38 in the shape of a sphere, wire, irregularly-shaped body, and the like, is positioned above or through the via hole. Desirably, the gold pre-form 38 has a volume that is greater than or equal to the volume of the metallized via hole 32. The shape and location of the gold preform should be such that the flow of gold is into the via hole 32 so that its open volume is filled when the gold melts. The time and temperature of the braze profile should ensure that the molten gold reacts with the titanium, niobium, or Ti/Nb thin film metallization 36 and flows to the bottom or lesser inner diameter portion 32B of the via hole 32 without the metallization completely reacting with the gold 38. Preferably, the brazing temperature ranges from about 1,064° C. to about 1,120° C. for a duration of from about 6 seconds to about 2 minutes.

Upon completion of the brazing operation, the solidified gold 38 forms a hermetically sealed and electrically conductive terminal pathway extending from the outer major surface 28 to the inner major surface 30 of the ceramic substrate 24. Then, the substrate is subjected to a lapping and polishing protocol to reduce its thickness from about 100 μm to less than 50 μm to thereby provide the previously described lid 12. To provide the lid 12 having a desired surface roughness that is preferably less than 50 nm, and more preferably less than 10 nm, the lapping and polishing steps are performed using a slurry or ceramic-coated grinding paper followed with a diamond polishing step. Providing the ceramic lid 12 with a preferred surface roughness that is less than 50 nm, and more preferably less than 10 nm, helps prevent coating defects including cracks, protrusions, discontinuities and coating adhesion problems when the hereinafter described cathode and anode current collectors 42, 48 and their corresponding cathode and anode active materials 44, 50 and the activating electrolyte 46 are supported on the ceramic lid. Upon completion of the lapping and polishing steps, the respective maximum diameter of the first and second or anode and cathode terminals 20, 22 at the outer major face 18 of the lid 12 is about 50 μm.

The ceramic lid 12 is also provided with a continuous or endless ring-shaped metallization strip 40 of titanium, niobium or other metallic material. The metallization strip 40 has an outer edge that is coincident with the outer surfaces of the first, second, third and fourth edges 14A, 14B, 14C and 14D. The ring-shaped lid metallization 40 has a width that ranges from about 1 μm to about 250 μm and a thickness that ranges from about 0.1 μm to 25 μm to define a surrounded open area immediately adjacent to the inner major face 18 of the lid 12.

A cathode current collector 42 is deposited as a thin-film layer contacting the inner major face 18 of the ceramic lid 12, spaced inwardly from the lid metallization strip 40. As shown in FIG. 2, the previously described electrically conductive pathway providing the first or cathode terminal 20 is aligned with the cathode current collector 42. The cathode current collector is preferably a continuous layer of titanium, devoid of perforations, and has a thickness measured outwardly from the inner major face 16 of the lid that ranges from about 0.1 μm to about 3 μm. Stainless steel, tantalum, platinum, gold, aluminum, cobalt, molybdenum, nickel, copper, nickel, and alloys thereof are also suitable materials for the cathode current collector 42. A gap of at least about 1 μm to about 250 μm separates the cathode current collector 42 from the lid metallization strip 40.

A layer of cathode active material 44 is supported on the cathode current collector 42. Preferably the cathode active material 44 extends to and is coincident with the outer periphery of the current collector. The cathode active material 44 has a thickness that ranges from about 1 μm to about 25 μm. Suitable cathode active materials are selected from $LiCoO_2$, $LiMnO_2$, $LiMn_2O_4$, $LiFePO_4$, $Ag_2V_4O_{11}$, $V_2O_5$.

A layer of solid electrolyte 46 of LiPON ($Li_xPO_yN_z$, where x=2.5 to 3.5, y=3.0 to 4.0 and z=0.15 to 0.50) contacts the cathode active material layer 44, opposite the cathode current collector 42 and the cathode terminal 20. The solid electrolyte layer 46 preferably extends to and curves over or around the outer peripheral edge of the cathode active material 44 but is spaced inwardly from the lid metallization strip 40. The solid electrolyte layer 46 has a thickness that ranges from about 1 μm to about 5 μm with the curved peripheral edge contacting the inner major face 16 of the lid substrate 12.

FIG. 2 illustrates that the cathode current collector 42, cathode active material 44 and the solid electrolyte layer 46 are provided with respective corner cut-outs 42A, 44A and 46A. These cut-outs reside adjacent to the junction where the second and fourth edges 14B, 14D of the lid 12 meet.

The corner cut-outs 42A, 44A and 46A of the respective cathode current collector 42, cathode active material 44 and the solid electrolyte layer 46 provide a space for an anode current collector 48 as a thin-film layer that contacts the inner major face 16 of the lid 12, spaced from the cathode current collector 42. The anode current collector 48 is a continuous layer, preferably of titanium or copper, that is devoid of perforations, and has a thickness that is comparable to that of the cathode current collector 42. Stainless steel, tantalum, platinum, gold, cobalt, molybdenum, nickel, and alloys thereof are also suitable materials for the anode current collector 48. A gap that ranges from about 1 μm to about 250 μm separates the anode current collector 48 from the cathode current collector 42.

In a similar manner as with the gold-braze terminal 20 residing in the lid 12 and contacting the cathode current collector 42 to thereby serve as a first electrically conductive terminal pathway or the positive terminal for the electrochemical cell 10, a second gold-braze 22 resides in the lid 12 aligned with the anode current collector 48. In the brazing step where the first gold-braze 20 forms a hermetic seal with the ceramic lid 12, the second gold-braze 22 also forms a hermetic seal with the lid substrate and has an inner surface that contacts the anode current collector 48. That way, the second gold-braze 22 serves as the negative terminal for the electrochemical cell 10.

A layer of anode active material 50 contacts the solid electrolyte 46 opposite the cathode active material 44. The anode active material 50 has an extending portion 50A that laps over the solid electrolyte 46 to contact the anode current collector 48. The solid electrolyte 46 in turn has an upstanding peripheral edge 46B that physically segregates the anode active material 50 from the cathode active material 44 contacting the cathode current collector 42. The anode active material 50 has a thickness that ranges from about 1 μm to about 25 μm. Suitable anode active materials include lithium and its alloys and intermetallic compounds including, for example, Li—Si, Li—Sn, Li—Al, Li—B and Li—Si—B alloys, and mixtures and oxides thereof.

Separately, a second plate-shaped ceramic base substrate 52 is selected from the group of yttria stabilized zirconia (yttria 3%~8 mol %), ceria stabilized zirconia, calcia stabilized zirconia, magnesia stabilized zirconia, alumina toughened zirconia (ATZ), zirconia toughened alumina (ZTA), polycrystalline alumina, and sapphire, and serves as the other half of the casing for the electrochemical cell 10. The ceramic base 52 has a peripheral edge 54 meeting an inner major face 56 opposite an outer major face 58.

The peripheral edge 54 of the ceramic base 52 comprises a rim that extends upwardly from the inner major face 56 to thereby provide a recess that is bounded by the opposed first and second upstanding edges 54A and 54B extending to and meeting with the third and fourth upstanding edges 54C and 54D. The edges 54A, 54B, 54C and 54D form a continuous upstanding edge surface 54E aligned along an imaginary plane that is parallel to the inner and outer major faces 56, 58 of the base 52. The edges are of substantially equal lengths themselves and are also equal in length to those of the corresponding first, second, third and fourth edges 14A, 14B, 14C and 14D of the lid 12. This provides the base 52 with a square shape in plan-view that matches the shape of the lid 12. In any event, the surface area of the outer major face 58 of the base 52 ranges from about 1 $mm^2$ to about 10 $cm^2$.

In alternate embodiments, the ceramic base 52 has a non-square shape that matches that of the ceramic lid 12. In that respect, those skilled in the art will readily appreciate that the lid and base substrates 12 and 52 of the electrochemical cells according to the present invention can have a myriad of different matching shapes, limited only by the device which the cell is designed to power.

The upstanding edge surface 54E of the ceramic base is provided with a surrounding metallization 59. The base metallization 59 is a continuous or endless strip of titanium, niobium or other metallic material having a ring-shape with an outer edge that is coincident the outer surface of the first, second, third and fourth edges 54A, 54B, 54C and 54D of the base 52. The upstanding edge of the ceramic base has a width that ranges from about 1 μm to about 250 μm to define a surrounded open recess immediately adjacent to the inner major face 56. The base metallization strip 59 has a width that ranges from about 1 µm to 250 µm and a thickness 21 that ranges from about 0.1 µm to about 25 µm.

During final cell assembly, with the lid 12 supporting the cathode current collector 42, the cathode active material 44, the solid electrolyte 46, the anode current collector 48 and the anode active material 50, the lid and base substrates are moved into registry with each other. An endless gold interlayer 60 having a ring-shape is supported on either the lid metallization strip 40 or the base metallization strip 59. In either configuration, the lid and base substrates 12, 34 are moved together until the lid metallization strip 40 contacts one side of the gold interlayer 60 and the base metallization strip 59 contacts the other side thereof. In this position, the combined thickness of the anode current collector 48 and the anode active material 50 is somewhat less than the thickness of the upstanding peripheral edge 54 of the base 52.

In alternate embodiments, one of the metallization layers 40, 59 can be eliminated and a single metal layer such as titanium alone can be used. In other embodiments, one of both metallization layers 40, 59 each comprise two metals such as of titanium and gold or three layers such as of titanium/niobium/gold, titanium/chromium/gold, titanium/magnesium/gold. The titanium interlayer is applied by physical vapor deposition (PVD) on one or both the casing halves 12, 52. In the case of two metals, titanium is applied by PVD on one or both casing halves 12, 52 and annealed to relieve internal stress from the coating process, followed by gold which can be applied by PVD or by using one or more thin gold foils. The overall coating thickness for the metallizations 40, 59 preferably ranges from about 1 µm to about 10 µm per substrate 12, 52.

Since secondary electrochemical cells activated with a solid electrolyte 46 typically undergo expansion and contraction during charging and discharging, the combined thickness of the cathode current collector 42 and the cathode active material 44 or the combined thickness of the anode current collector 48 and the anode active material 50 is somewhat less than the thickness of the upstanding peripheral edge 54 of the base 52. The unoccupied space inside the casing is sufficient to accommodate this cycling induced dimensional change.

The lid 12 is preferably of a single-crystal alumina (sapphire), which is substantially transparent. The transparent sapphire lid 12 allows that substrate and the ceramic base 54 serving as the two case halves to be joined together by laser welding through the transparent ceramic lid 12 to melt the gold interlayer pre-form 60 into intimate hermetic contact with the opposed lid and base metallizations strips 40 and 59 to thereby hermetically seal the casing. This facilitates fabrication of electrochemical cells in multi-cell arrays/sheets to make the manufacturing process more cost-effective and practical.

Figure 2A:
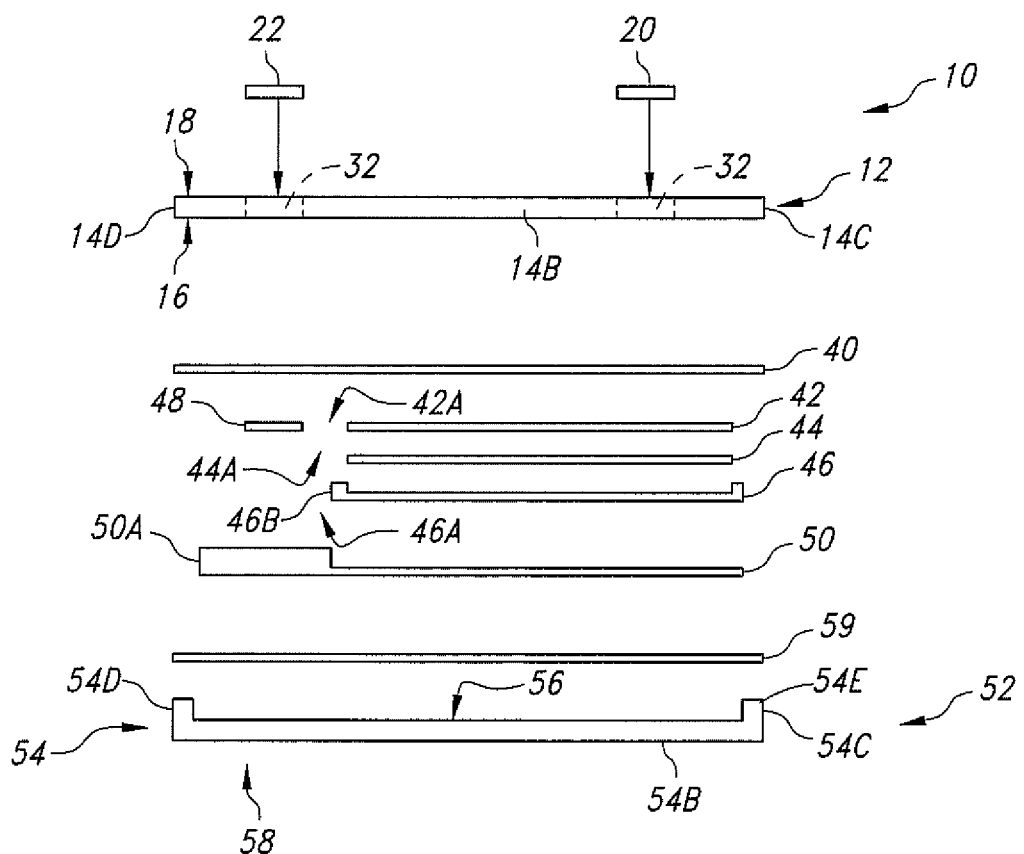
FIG. 2A is an exploded side-elevational view of the electrochemical cell 10 shown in FIG. 2, but without the gold metallization ring 50.

FIG. 2A illustrates an alternate embodiment of the electrochemical cell 10 where the gold pre-form 60 has been eliminated. Instead, the lid and base metallization strips 40 and 59 are laser welded together through the transparent sapphire lid 12 without the gold pre-form 60. In still a further embodiment, gold is sputtered directly onto at least one or both metallization strips 40, 59, and a laser is preferably used to hermetically weld the lid 12 to the base 52 to thereby hermetically seal the casing.

In an alternate embodiment, the anode and cathode active materials can be switched with each other. In this embodiment, the electrically conductive pathway comprising terminal 20 contacts the anode current collector and the electrically conductive pathway comprising terminal 22 contacts the cathode current collector.

Figure 6:
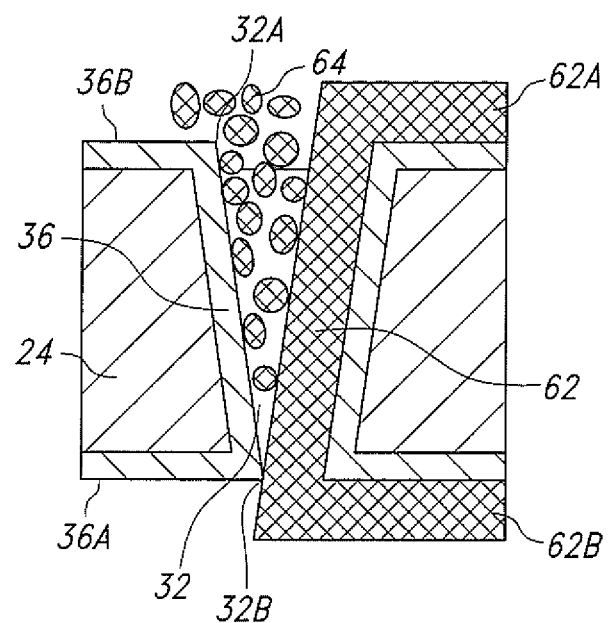
FIG. 6 illustrates an alternate process for forming the cathode and anode terminals 20, 22 in the lid 12 shown in FIGS. 1, 2 and 2A where a gold wire 62 extends through the via hole 32 with a gold wire 62 and gold flakes 64 positioned in the metallized via hole 32.

FIG. 6 illustrates an alternate embodiment for providing the first and second terminal 20, 22. This embodiment includes the tapered via hole 32 shown in FIG. 3 extending from the greater diameter outer via portion 32A at the outer major surface 28 to the lesser diameter inner via portion 32B at the inner major surface 30. The tapered via hole 32 is provided with an interfacial metallization 36 on the inner surface. This metallization preferably extends to an inner metallization portion 36A contacting the inner major surface 30 of the ceramic substrate 24 and an outer metallization portion 36B contacting the outer major surface 28 thereof. Instead of the gold pre-form 38 shown in FIG. 3, however, a gold wire 62 is positioned in the metallized via hole 32. The gold wire is in the form of a very flexible thread or slender rod and has an outer wire portion 62A laying on the outer major surface 28 of the substrate 24 and an inner wire portion 62B laying on the inner major surface 30 thereof. While the gold wire 62 does not completely fill or occupy the open volume of the metallized via hole 32, FIG. 6 shows the wire 62 contacting the entire ceramic perimeter defining the inner via portion 32B at the inner major surface 30. However, that is also not necessary. It is only required that the gold wire occupy most of the open area at the inner via hole portion 32B. The remaining portion of the open volume of the via hole 32 not occupied by the gold wire is filled with a gold flake material 64. As used herein, the term "flake" relates to a small loose mass or thin flattened piece of gold.

This assembly in then subjected to a brazing operation to cause the gold wire 62 and the gold flake 64 to melt and flow into the metallized via hole 32. The time and temperature of the braze profile should ensure that the molten gold wire 62 and flake 64 react with the titanium, niobium, or Ti/Nb thin film metallization 36 and flow to the bottom or lesser inner diameter portion 32B of the via hole 32 without the metallization completely reacting with the gold 62/64. Preferably, the brazing temperature ranges from about 1,064° C. to about 1,120° C. for a duration of from about 6 seconds to about 2 minutes.

Figure 6A:
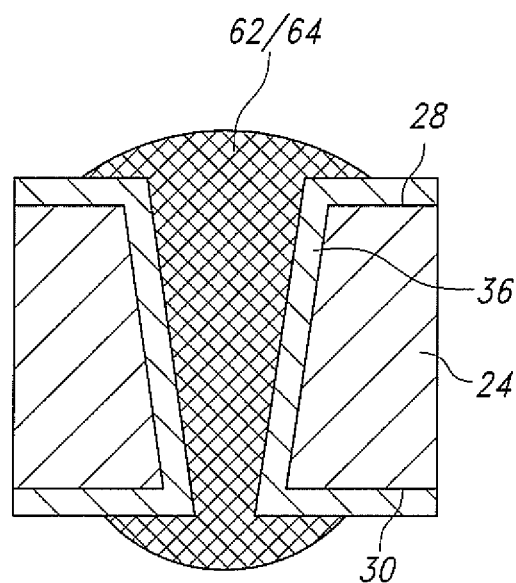
FIG. 6A shows the resulting gold braze extending both below and above the respective outer and inner major surfaces 28, 30 of the ceramic substrate 24 shown n FIG. 3.
Figure 6B:
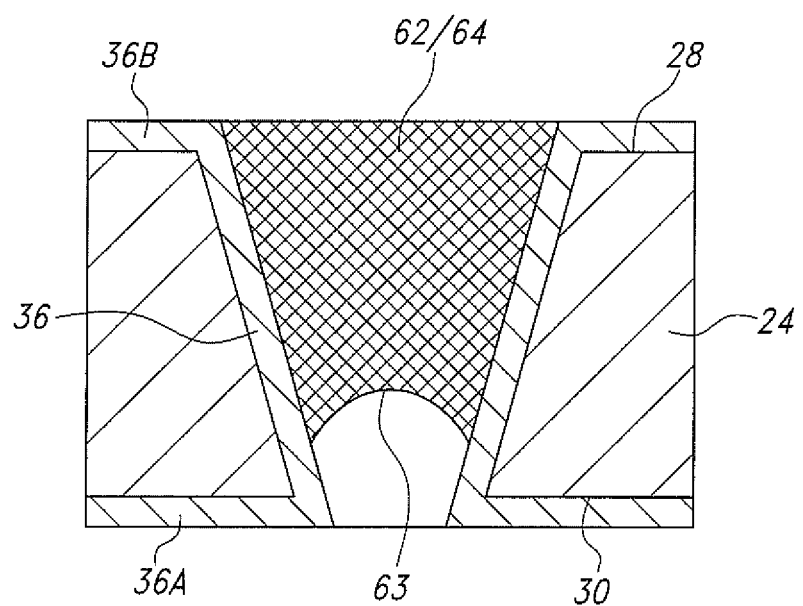
FIG. 6B illustrates the negative meniscus 63 that forms upon brazing without the inner metallization 36A contacting the inner major surface 30 of the ceramic substrate 24 and without the inner wire portion 62B of the gold wire contacting the inner metallization 36A.

Without the inner metallization 36A contacting the inner major surface 30 of the ceramic substrate 24 and without the inner wire portion 62B of the gold wire contacting the inner metallization 36A, upon brazing, the gold wire and flakes 62, 64 will not completely fill the open volume of the tapered via hole 32. Instead, and as shown in FIG. 6B, a negative meniscus 63 will form. Since the diameter of the inner via hole portion 32B is relatively small (about 25 µm), the surface tension at the gold/metallization interface prevents the gold from flowing completely through the via hole. According to the present invention, however, contacting the gold wire 62 to at least the inner metallization portion 36A and preferably both the inner and outer metallization portions 62A, 62B helps the gold braze extend both below and above the respective outer and inner major surfaces 28, 30 of the ceramic substrate 24, as shown in FIG. 6A. The gold wire portions 62A and 62B contacting the outer and inner major surfaces of the ceramic substrate act as wicks, ensuring that the gold pulls completely through the via hole 32. The result is gold domes adjacent to the outer and inner major surfaces 28, 30.

As with the embodiment illustrated in FIG. 3, upon completion of the brazing operation, the solidified gold 62/64 body forms a hermetically sealed and electrically conductive terminal pathway extending from the outer major surface 28 to the inner major surface 30 of the ceramic substrate 24. The substrate is then subjected to a lapping and polishing protocol to remove the gold domes and reduce the substrate thickness from about 100 µm to less than 50 µm to form the previously described lid 12. To provide the ceramic lid 12 with a preferred surface roughness that is less than 50 nm, and more preferably less than 10 nm, lapping and polishing steps are performed using a slurry or ceramic-coated grinding paper followed with a diamond polishing step. This helps prevent coating defects including cracks, protrusions, discontinuities and coating adhesion problems when the previously described cathode and anode current collectors 42, 48 and their respective cathode and anode active materials 44, 50 and the activating electrolyte 46 are supported on the ceramic lid. Upon completion of the lapping and polishing steps, the respective maximum diameter of the first and second or anode and cathode terminals 20, 22 at the outer major face 18 of the lid 12 is about 50 μm.

In an alternate embodiment, the gold domes are not lapped into a planar shape with respect to the outer and inner major surfaces 28, 30 of the ceramic substrate 24. Instead, they are left to aid in a future chip attachment operation, and the like.

Figure 7:
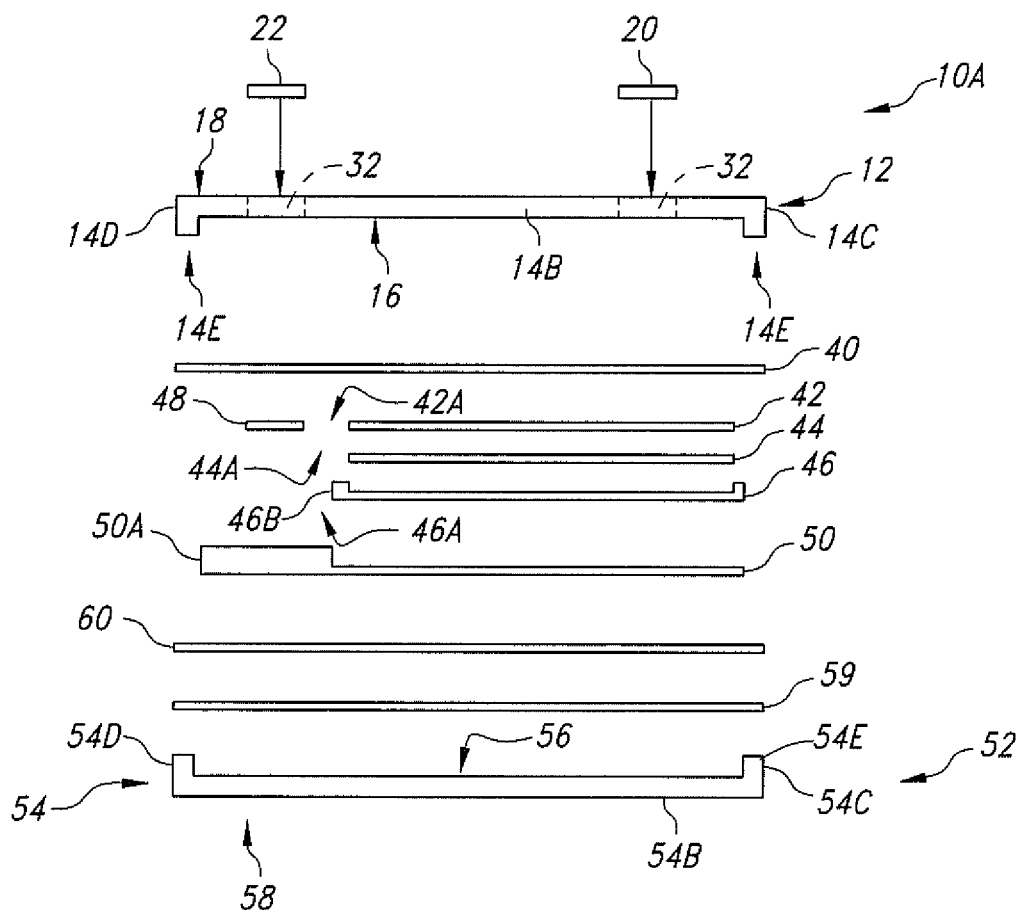
FIG. 7 is an exploded side-elevational view of another embodiment of an electrochemical cell 10A according to the present invention.

FIG. 7 illustrate another embodiment of the electrochemical cell 10A according to the present invention. Electrochemical cell 10A is similar to the electrochemical cell 10 shown in FIGS. 2 and 2A with the exception that instead of being a planar structure, the lid 12 has a depending rim-shaped peripheral edge 14E. The base 52 has the upstanding rim-shaped peripheral edge 54E previously described with respect to FIGS. 2 and 2A. This means that the combined height of edges 14E and 54E of cell 10A in FIG. 7 is substantially equal to the height of the depending edge 14E in FIGS. 2 and 2A. In all other aspects, the cells 10, 10A are substantially similar.

Figure 7A:
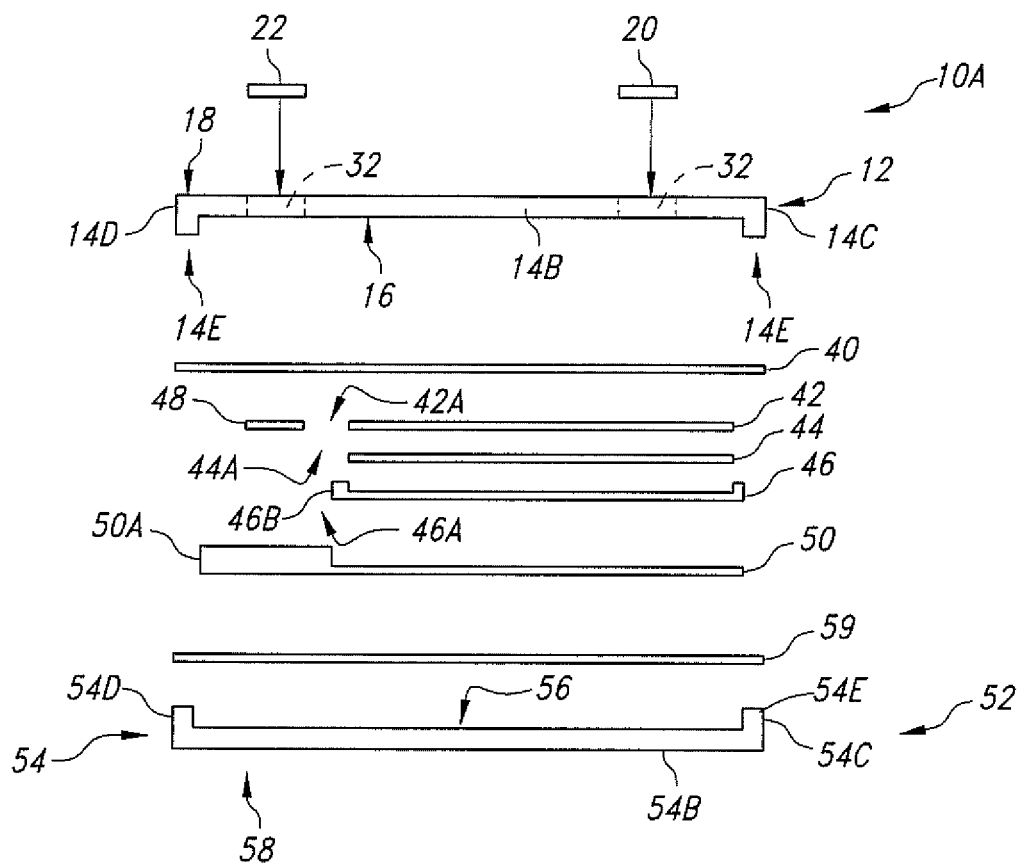
FIG. 7A is an exploded side-elevational view of the electrochemical cell 10A shown in FIG. 7, but without the gold metallization ring 50.

In a similar manner as with the cell 10 illustrated in FIG. 2A where the lid and base metallization strips 40 and 59 are laser welded together without the gold pre-form 60, FIG. 7A illustrates a similar embodiment, but with the lid 12 having a depending rim-shaped peripheral edge 14E. As before, gold is sputtered directly onto at least one or both the lid and base metallization strips 40, 59, and a laser is preferably used to hermetically weld the transparent sapphire lid 12 to the base 34 to thereby hermetically seal the casing.

Thus, with the outer major faces 18 and 58 of the respective lid and base substrates 12, 52 each having a surface area ranging from about 1 mm² to about 10 cm², and with the height of the cell as measured from the outer major face 18 of the lid 12 to the outer major face 58 of the base 52 ranging from about 250 μm to about 2.5 mm, the cells 10 and 10A of the present invention represent an advancement in electrochemical technology in that they can be built with a total volume that is less than 0.5 cc but, as hermetically sealed enclosures, are capable being implanted for extended periods of time. Moreover, providing the electrically conductive terminal pathways 20, 22 with their greater diameter portions exposed at the outer major face of the lid 12 helps with connecting the miniature electrochemical cells 10 and 10A to a load that is intended to be power by the cells.

It is appreciated that various modifications to the inventive concepts described herein may be apparent to those of ordinary skill in the art without departing from the spirit and scope of the present invention as defined by the appended claims.

What is claimed is:

1. An electrochemical cell, comprising:
   a) a ceramic casing, comprising:
      i) a first ceramic substrate having a first peripheral edge extending to and meeting with opposed first substrate outer and inner major faces;
      ii) a first ring-shaped metallization contacting the first substrate inner major face adjacent to the first substrate peripheral edge, wherein the first ring-shaped metallization comprises titanium or niobium;
      iii) a gold ring-shaped layer contacting the first ring-shaped metallization; and
      iv) a second ceramic substrate having a second substrate peripheral edge extending to and meeting with opposed second substrate outer and inner major faces; and
   b) a first electrode current collector contacting the first substrate inner major face, spaced inwardly from the first ring-shaped metallization;
   c) a first electrode active material contacting the first electrode current collector;
   d) a second electrode current collector contacting the first substrate inner major face, spaced inwardly from the first ring-shaped metallization, wherein the second electrode current collector is side-by-side but spaced from the first electrode current collector;
   e) a solid electrolyte contacting the first electrode active material;
   f) a second electrode active material contacting the second electrode current collector and contacting the solid electrolyte opposite the first electrode active material;
   g) a first terminal via hole and a second terminal via hole, both terminal via holes extending through the first ceramic substrate;
   h) a first gold body hermetically sealed to the first ceramic substrate in the first terminal via hole, wherein the first gold body is conductively contacted to the first electrode current collector to thereby serve as a first terminal; and
   i) a second gold body hermetically sealed to the first ceramic substrate in the second terminal via hole, wherein the second gold body is conductively contacted to the second electrode current collector to thereby serve as a second, opposite polarity terminal for the electrochemical cell,
   j) wherein the first and second ceramic substrates are hermetically sealed together at the gold ring-shaped layer contacting the first ring-shaped metallization to thereby form the ceramic casing housing the electrode assembly.

2. The electrochemical cell of claim 1, wherein the first electrode active material is a cathode active material and the second electrode active material is an anode active material, or the first electrode active material is an anode active material and the second electrode active material is a cathode active material.

3. The electrochemical cell of claim 1, wherein the outer and inner major faces of the first ceramic substrate are both substantially planar.

4. The electrochemical cell of claim 1, wherein the first and second terminal via holes extending through the first ceramic substrate are provided with a respective first and second interfacial metallization comprising titanium or niobium, and wherein the first and second gold bodies are hermetically sealed to the respective first and second interfacial metallizations in the first and second terminal via holes.

5. The electrochemical cell of claim 1, wherein at least one of the first and second terminal via holes supporting the respective first and second gold bodies has a taper that ranges from about 85° to 30° so that the at least one terminal via hole has a greater diameter outer via portion at the first substrate outer major face and a lesser diameter inner via portion at the first substrate inner major face, the taper of the at least one of the first and second terminal via holes being measured from the lesser diameter inner via portion at the first substrate inner major face toward the greater diameter outer via portion at the outer major face.

6. The electrochemical cell of claim 1, wherein at least one of the first and second ceramic substrates has an extending peripheral rim forming the respective first and second substrate peripheral edge.

7. The electrochemical cell of claim 1, wherein the solid electrolyte contacting the first electrode active material opposite the first electrode current collector does not contact the second electrode current collector.

8. The electrochemical cell of claim 1, wherein a second ring-shaped metallization comprising titanium or niobium contacts the second substrate inner major face adjacent to the second substrate peripheral edge, and wherein the first and second ring-shaped metallizations are hermetically sealed to each other at the gold ring-shaped layer to thereby hermetically seal the first and second ceramic substrates together to form the ceramic casing.

9. The electrochemical cell of claim 8, wherein at least one of the first and second ceramic substrates has an extending peripheral rim forming the respective first and second substrate peripheral edge, the extending peripheral rim supporting a respective one of the first and second ring-shaped metallizations, and wherein, with the gold ring-shaped layer hermetically sealing the first and second ring-shaped metallizations to each other to thereby hermetically seal the first and second ceramic substrates together, a sum of a first thickness of the first electrode current collector, a second thickness of the first electrode active material, a third thickness of the solid electrolyte, and a fourth thickness of the second electrode active material is less than the distance from the first ceramic substrate inner major face to the second ceramic substrate inner major face.

10. The electrochemical cell of claim 8, wherein at least one of the first and second ceramic substrates has an extending peripheral rim forming the respective first and second substrate peripheral edge, the extending peripheral rim supporting a respective one of the first and second ring-shaped metallizations, and wherein, with the first and second ring-shaped metallizations comprising titanium and with the gold ring-shaped layer hermetically sealing the first and second ring-shaped metallizations to each other to thereby hermetically seal the first and second ceramic substrates together, a sum of a first thickness of the first electrode current collector, a second thickness of the first electrode active material, a third thickness of the solid electrolyte, and a fourth thickness of the second electrode active material is less than the distance from the first ceramic substrate inner major face to the second ceramic substrate inner major face.

11. The electrochemical cell of claim 10, wherein the sum of the first, second, third, and fourth thicknesses is less than the distance from the first ceramic substrate inner major face to the second ceramic substrate inner major face by about 1 μm to about 100 μm.

12. The electrochemical cell of claim 1, wherein the first and second current collectors are individually selected from titanium, copper, stainless steel, tantalum, platinum, gold, aluminum, cobalt, molybdenum, nickel, and alloys thereof.

13. The electrochemical cell of claim 1, wherein at least one of the first and second inner major faces of the respective first and second ceramic substrates has a surface roughness that is greater than zero, but less than 50 nm.

14. The electrochemical cell of claim 1, wherein the solid electrolyte extends between the first and second electrode current collectors.

15. The electrochemical cell of claim 1, wherein the first and second ceramic substrates are selected from yttria stabilized zirconia, ceria stabilized zirconia, calcia stabilized zirconia, magnesia stabilized zirconia, alumina toughened zirconia, zirconia toughened alumina, polycrystalline alumina, and sapphire.

16. The electrochemical cell of claim 1, wherein at least one of the first and second ceramic substrates is of a substantially transparent sapphire.

17. The electrochemical cell of claim 1, wherein the anode active material is selected from lithium, Li—Si, Li—Sn, Li—Al, Li—B and Li—Si—B alloys, and wherein the cathode active material is selected from $LiCoO_2$, $LiMnO_2$, $LiMn_2O_4$, $LiFePO_4$, $Ag_2V_4O_{11}$, $V_2O_5$, and mixtures thereof.

18. The electrochemical cell of claim 1, wherein the solid electrolyte comprises $Li_xPO_yN_z$, where x=2.5 to 3.5, y=3.0 to 4.0 and z=0.15 to 0.50.

19. The electrochemical cell of claim 1 having a total volume that is less than 0.5 cc.

20. An electrochemical cell, comprising:
a) a ceramic casing, comprising:
  i) a first sapphire substrate having a first peripheral edge extending to and meeting with opposed first substrate outer and inner major faces;
  ii) a first ring-shaped metallization comprising titanium or niobium contacting the first sapphire substrate inner major face adjacent to the first substrate peripheral edge;
  iii) a second ceramic substrate having a second substrate peripheral rim extending to and meeting with opposed second substrate outer and inner major faces;
  iv) a second ring-shaped metallization comprising titanium or niobium contacting the second second substrate peripheral rim; and
  v) a gold ring-shaped layer contacting at least one of the first and second ring-shaped metallizations; and
b) a first electrode current collector contacting the first sapphire substrate inner major face, spaced inwardly from the first ring-shaped metallization;
c) a first electrode active material contacting the first electrode current collector;
d) a second electrode current collector contacting the first sapphire substrate inner major face, spaced inwardly from the first ring-shaped metallization, wherein the second electrode current collector is side-by-side but spaced from the first electrode current collector;
e) a solid electrolyte contacting the first electrode active material;
f) a second electrode active material contacting the second electrode current collector and contacting the solid electrolyte opposite the first electrode active material;
g) a first terminal via hole and a second terminal via hole, both terminal via holes extending through the first sapphire substrate;
h) an interfacial metallization selected from titanium, niobium, and a mixed Ti/Nb layer contacted to the first sapphire substrate in the first and second terminal via holes;
i) a first gold body hermetically sealed to the interfacial metallization in the first terminal via hole in the first sapphire substrate, wherein the first gold body is conductively contacted to the first electrode current collector to thereby serve as a first terminal; and j) a second gold body hermetically sealed to the interfacial metallization in the second terminal via hole in the first sapphire substrate, wherein the second gold body is conductively contacted to the second electrode current collector to thereby serve as a second, opposite polarity terminal for the electrochemical cell, k) wherein the first sapphire substrate and the second ceramic substrate are hermetically sealed together at the gold ring-shaped layer contacting the first and second ring-shaped metallizations to thereby form the ceramic casing housing the electrode assembly.

21. The electrochemical cell of claim 20, wherein the first electrode active material is a cathode active material and the second electrode active material is an anode active material, or the first electrode active material is an anode active material and the second electrode active material is a cathode active material.

22. The electrochemical cell of claim 20, wherein at least one of the first and second terminal via holes supporting the respective first and second gold bodies has a taper that ranges from about 85° to 30° so that the at least one terminal via hole has a greater diameter outer via portion at the first substrate outer major face and a lesser diameter inner via portion at the first substrate inner major face, the taper of the at least one of the first and second terminal via holes being measured from the lesser diameter inner via portion at the first substrate inner major face toward the greater diameter outer via portion at the outer major face.

23. The electrochemical cell of claim 20, wherein the interfacial metallization in the first and second terminal via holes individually has a thickness that ranges from about 0.1 μm to about 10 μm.

24. The electrochemical cell of claim 1, wherein the first ring-shaped metallization contacting the first ceramic substrate peripheral edge is selected from titanium, niobium, titanium and gold, titanium/niobium/gold, titanium/chromium/gold, and titanium/magnesium/gold.

25. The electrochemical cell of claim 4, wherein the interfacial metallization in the first and second terminal via holes individually has a thickness that ranges from about 0.1 μm to about 10 μm.

26. An electrochemical cell, comprising:

a) a ceramic casing, comprising:
   i) a first ceramic substrate having a first peripheral edge extending to and meeting with opposed first substrate outer and inner major faces;
   ii) a second ceramic substrate having a second substrate peripheral edge extending to and meeting with opposed second substrate outer and inner major faces;
   iii) a ring-shaped metallization contacting the second substrate inner major face adjacent to the second substrate peripheral edge, wherein the ring-shaped metallization comprises titanium or niobium; and
   iv) a gold ring-shaped layer contacting the ring-shaped metallization; and b) a first electrode current collector contacting the first substrate inner major face, spaced inwardly from the first peripheral edge;

c) a first electrode active material contacting the first electrode current collector;

d) a second electrode current collector contacting the first substrate inner major face, spaced inwardly from the first peripheral edge, wherein the second electrode current collector is side-by-side but spaced from the first electrode current collector;

e) a solid electrolyte contacting the first electrode active material;

f) a second electrode active material contacting the second electrode current collector and contacting the solid electrolyte opposite the first electrode active material;

g) a first terminal via hole and a second terminal via hole, both terminal via holes extending through the first ceramic substrate;

h) a first gold body hermetically sealed to the first ceramic substrate in the first terminal via hole, wherein the first gold body is conductively contacted to the first electrode current collector to thereby serve as a first terminal; and i) a second gold body hermetically sealed to the first ceramic substrate in the second terminal via hole, wherein the second gold body is conductively contacted to the second electrode current collector to thereby serve as a second, opposite polarity terminal for the electrochemical cell, j) wherein the first and second ceramic substrates are hermetically sealed together at the gold ring-shaped layer contacting the ring-shaped metallization to thereby form the ceramic casing housing the electrode assembly.

* * * * *